United States Patent

[11] 3,631,314

[72] Inventor Wilhelmus Theodorus Hendrikus Hetterscheid
Nijmegen, Netherlands

[21] Appl. No. 737,009
[22] Filed June 14, 1968
[45] Patented Dec. 28, 1971
[73] Assignee U.S. Philips Corporation
New York, N.Y.
[32] Priority June 17, 1967
[33] Netherlands
[31] 6708465

[54] CIRCUIT ARRANGEMENT COMPRISING A HIGH-VOLTAGE TRANSISTOR
12 Claims, 8 Drawing Figs.

[52] U.S. Cl. ... 315/27 TD, 307/253
[51] Int. Cl. ... H01j 29/76
[50] Field of Search ... 315/27 TD; 307/253

[56] References Cited

UNITED STATES PATENTS

| | | | |
|---|---|---|---|
| 3,129,354 | 4/1964 | Hellstrom | 315/27 TD |
| 3,204,145 | 8/1965 | Schneider | 315/27 TD |

OTHER REFERENCES

Reich et al., Active Devices, 1966, p. 304

*Primary Examiner*—Rodney D. Bennett, Jr.
*Assistant Examiner*—Joseph G. Baxter
*Attorney*—Frank R. Trifari

ABSTRACT: A circuit for increasing the speed of collector current reduction of a high-voltage transistor, in which an impedance is connected in series with the base to restrict variation in reverse base current. The specification discloses embodiments in which the impedance is a parallel circuit of a resistor and diode connected in the pass direction of base-emitter current, and in which the impedance is a coil.

INVENTOR.
WILHELMUS TH.H.HETTERSCHEID

BY
[signature]
AGENT

INVENTOR.
WILHELMUS T.H. HETTERSCHEID
BY
Frank R. Trifari
AGENT

CIRCUIT ARRANGEMENT COMPRISING A HIGH-VOLTAGE TRANSISTOR

The present invention relates to a switching circuit for a high voltage power transistor. More particularly, the invention relates to a switching circuit arrangement comprising a high voltage power transistor, control means which supply a pulsatory switching signal between the base electrode and the emitter electrode of the transistor by means of a transformer winding, and a load impedance connected to the collector electrode of the transistor. The collector current of the saturated transistor, which is supplied by a voltage source, is interrupted under the influence of the pulsatory switching signal supplied to the transistor.

Such circuit arrangements are used for a variety of purposes. When the load impedance is constructed as a resistor, it is possible to use the circuit arrangement as a simple amplifier of a pulsatory input signal. When the load impedance consists of a transformer having a rectifier circuit connected to a secondary winding thereof, a high direct voltage can be generated in this manner. When a coil is included in the load impedance, a sawtooth current can be obtained in said coil which may be used, for example, for deflection purposes in cathode-ray tubes.

The use of a high voltage power transistor presents the possibility of supplying a high power to the load impedance in a simple manner. In this case the transistor is driven into saturation so that a high current through the transistor is associated with a low voltage drop across the transistor. The result would have to be a circuit arrangement with a high output. However, a drawback of the method described is that the interruption of the collector current of a saturated high voltage power transistor proceeds very slowly. As a result of this the output deteriorates and due to high local dissipation in the transistor the latter may be destroyed.

It is known to accelerate the blocking of a transistor in a circuit arrangement by supplying a specially shaped pulsatory turnoff signal to the base of the transistor. This turnoff signal may have, for example, two voltage levels. The first level introduces a cutoff condition in the transistor and is much higher in absolute value than the second level which corresponds to the value at which the transistor could cutoff and then remain cutoff. The higher value of the first level relative to the second creates the advantage that the charge carriers present in the base layer of the transistor are removed more rapidly so that the transistor can be switched off more rapidly. It is found in practice that this method provides no favorable result when used in high voltage power transistors.

According to a first concept underlying the present invention the reason that the collector current of a high voltage power transistor cannot be interrupted in a rapid manner results from the layer thickness of the collector of the transistor in combination with the method of driving the transistor into the saturation condition in which the transistor has an excess of charge carriers. In comparison with transistors suitable for low voltage, the collector layer of a high voltage transistor is thicker since the collector layer must be capable of holding the high voltage without breakdown. Power transistors require a thick collector layer for reasons of dissipation. For high voltage power transistors, both requirements must be satisfied. The result is that a saturated high voltage power transistor contains a very large excess of charge carriers both in the base layer and in the collector layer, which carriers must be removed during the period that the transistor is switched off. This very large excess of charge carriers in the collector layer of the transistor, together with the large resistance which the comparatively thick collector layer provides, prevent the rapid blocking of the transistor in known manner under the influence of a high voltage at the base electrode.

It is an object of the invention to obtain a very rapidly switched-off collector current in a saturated high voltage transistor, in particular a power transistor. For that purpose the circuit arrangement according to the invention is characterized in that to increase the average differential coefficient of the collector current with respect to time during the turnoff period of the collector current, the control means are connected on the one hand directly to the emitter electrode and on the other hand to the base electrode of the transistor through an impedance restricting or limiting the variation in the base current during the switching off of the base current of the transistor.

The invention is also based on the recognition of the fact that the instant at which the emitter-base junction becomes cutoff under the influence of the switching signal has to be delayed due to the impedance restricting the variation of the base current. This restricted variation of the base current may be found both in restricting the amplitude of a current step and in restricting the value of the differential coefficient of the current with respect to time. During the extended turnoff period, the excessive number of charge carriers in the collector layer may be removed therefrom. According to this method of the invention, the properties of the transistor are used as long as possible in contrast with the known described method in which the base-emitter junction is blocked as rapidly as possible by supplying a high voltage to the base electrode.

In order that the invention may be readily carried into effect, the principle of the circuit arrangement according to the invention will now be described in greater detail, by way of example, with reference to the accompanying figures, in which.

Figure 1A:
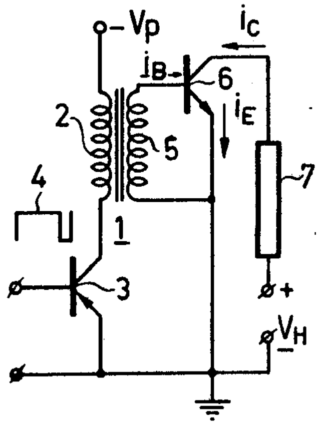
FIGS. 1 shows an embodiment of a known circuit arrangement with associated current and voltage curves.
Figure 1B:
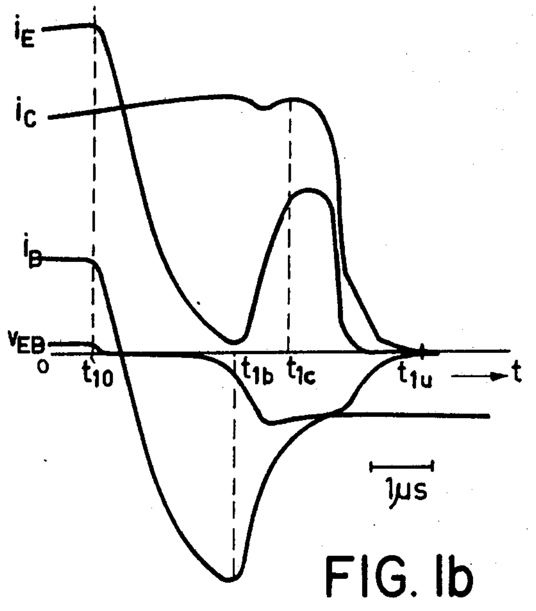

FIG. 1*a* shows a known circuit arrangement with which are associated the curves shown in FIG. 1*b* which represent currents and a voltage. A primary winding 2 of the transformer 1 is connected at one end to the collector electrode of a PNP-transistor 3, and at the other end to a terminal of a voltage source having a potential-$V_p$ not shown, whose other terminal is connected to ground. The emitter electrode of the transistor 3 is connected to ground and a pulsatory voltage 4 is applied to its base electrode. A secondary winding 5 of the transformer 1 is connected between the base and emitter electrode of a high voltage power transistor 6 of the NPN-type. The emitter electrode of the transistor 6 is connected to ground and the collector electrode is connected, through a load impedance 7, to a terminal of a voltage source $V_H$ of, for example, 220 volts, which has a positive potential. The other terminal of the voltage source is connected to ground.

Transformer 1 and transistor 3 constitute the control means (1,3) for operating the transistor 6. The pulsatory voltage 4 should be applied with a minimum of distortion between the base and emitter electrodes of the transistor 6 for which purpose the transformer 1 is constructed so that the stray reactance thereof is negligibly small. Dependent upon the purpose for which the circuit arrangement shown in FIG. 1*a* is used and to which the construction of the load impedance is adapted, the generation of the desired shape of the pulsatory voltage 4 takes place. For television purposes, in which the circuit arrangement may be used for generating a sawtooth current through line deflection coils forming a part of the impedance 7, the pulsatory voltage 4 may be generated at the line frequency by an oscillator. Since all this is of minor importance for explaining the invention, which has for its object the very rapid switching-off of the collector current of a saturated high voltage power transistor, it also is left undecided in this known circuit arrangement in what manner the load impedance 7 is constructed.

The control means (1,3) pass the pulsatory voltage 4 to the base and emitter electrodes of the transistor 6, which should be blocked by the trailing edge of the voltage 4. The phenomena which then occur in the known circuit arrangement are illustrated in FIG. 1*b*.

In FIG. 1*b*, the currents $i_E$, $i_C$ and $i_B$ which flow in the emitter, collector and base electrodes, respectively, of the transistor 6, are plotted as a function of time. The same is done for the voltage $v_{EB}$ across the emitter-base junction. The trailing edge of the pulsatory switching signal applied between the base and emitter electrodes is assumed to occur at the instant $t_{10}$. It is found that the base current $i_B$ rapidly falls to zero, then starts flowing in the reverse direction, and reaches a maximum value at the instant $t_{1B}$. At the same time the emitter current $i_E$ falls to nearly zero. It is found that the collector current $i_C$ is not at all influenced in said period. The cause thereof is that the base current $i_B$ flowing in the reverse direction removes the excess charge carriers from the transistor 6 up to the instant $t_{1b}$. This excess of charge carriers is caused by the saturation of the transistor 6 and the value of the excess, as is known, has no influence on the collector current $i_C$. Only after the excess charge carriers have been reduced to the concentration which corresponds to the value of the flowing collector current $i_C$ can the switching-off phenomenon become noticeable in the collector current $i_C$.

Round about the instant $i_{1b}$, the base-emitter junction becomes cutoff as may be seen with reference to curve $v_{EB}$. After the instant $t_{1b}$ by the emitter current $i_E$ again increases. This may be explained by the fact that between the emitter and the collector layer a conductive connection is locally formed through the base layer which, however, does not influence the base layer in its entirety (so-called contraction effect).

The turnoff of the collector current $i_C$ begins to set in from the instant $t_{10}$. At the instant $t_{1u}$ the turnoff is completed. During the turnoff period $t_{1c}$ to $t_{1u}$ (in the example of FIG. 1*b*, approximately 2 $\mu$sec.) the variation of the collector current $i_C$ is found to occur roughly in three phases. In the first phase the current $i_C$ decreases very rapidly with a large differential coefficient (rate of change) with respect to time. Then a bend occurs in the curve which introduces a phase having a smaller differential coefficient with respect to time. The emitter current $i_E$ has decreased to zero and, according to a recognition of the invention, the above-mentioned differential coefficient with respect to time depends upon the recombination rate of the charge carriers in the base layer and collector layer. The third phase shows a current $i_C$ which slowly decreases to zero with a still lower differential coefficient with respect to time. Starting from a maximum value of the collector current $i_C$ equal to 2A, it is found that the differential coefficient with respect to time during switching off the collector current $i_C$ reaches a maximum value of approximately 5 A/$\mu$sec., while the average value during the overall switching-off period of about 2 $\mu$sec. is only approximately 1 A/$\mu$sec.

In order to realize the object of the invention, namely increasing the average differential coefficient of the collector current $I_c$ with respect to time during the turnoff period of said current, FIGS. 2 and 3 show two measures according to the invention. Components corresponding to those already stated in FIG. 1 have been given like reference numerals.

Figure 2A:
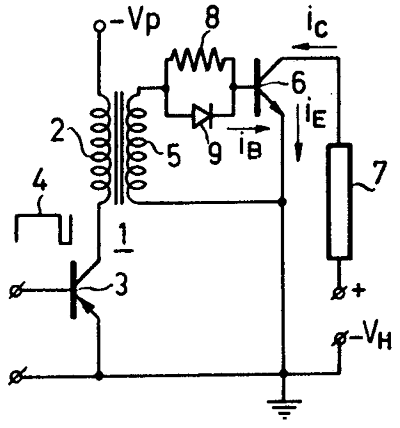
FIGS. 2 is an embodiment of the circuit arrangement according to the invention with associated current curves.

According to a first measure of the invention, the secondary winding 5 of the transformer 1 in FIG. 2*a* is connected to the base electrode of the transistor 6 through a parallel arrangement of a resistor 8 and an element conducting current in one direction and constructed as a diode 9. The current conductive direction of the diode 9 corresponds to the pass direction of the emitter-base junction of the transistor 6. The diode 9 constitutes a short-circuit across the resistor 8 for the base current $i_B$ when the transistor 6 is in a normal current-conductive condition between the emitter and collector electrodes under the influence of the control means (1,3). When, however, the base current $i_B$ flows in the reverse direction (so-called inverse current) the diode 9, is cut off and the base current $i_B$ flows through the resistor 8.

Figure 2B:
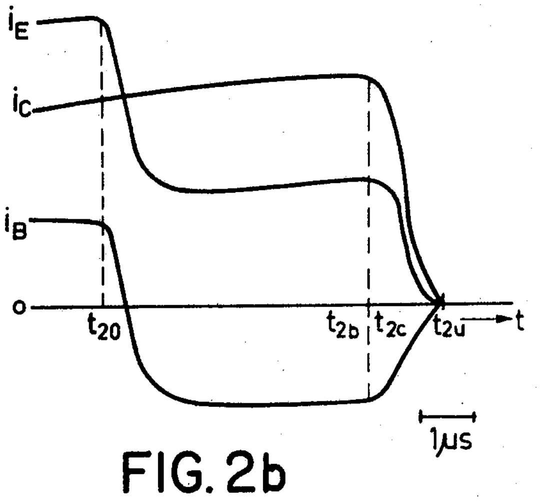

FIG. 2*b* clearly shows with respect to FIG. 1*b* the effect obtained according to the invention. At the instant $t_{20}$ the trailing edge of the pulsatory signal 4 occurs. As already described with reference to FIG. 1*b*, the base current $i_B$ will try to reach a maximum value in the reverse direction for removing the excess quantity of charge carriers from the saturated transistor 6. This maximum value is restricted by the resistor 8 and thus cannot exceed a value determined by the voltage produced across the secondary winding 5 divided by the resistance value of the resistor 8. Since, however, the excess of charge carriers has first to be removed from the transistor 6 before the collector current $i_C$ can be reduced, the result is that, compared with current $i_B$ in FIG. 1*b*, current $i_B$ in FIG. 2*b* has to flow longer for this purpose in connection with the smaller maximum value of the inverse base current. If at the instant $t_{2b}$ a concentration of charge carriers is reached which matches the value of collector current $i_C$, it is found that the instant $t_{2c}$ at which the current $i_C$ begins to decrease substantially coincides with the instant $t_{2b}$. The turnoff period $t_{2c}$ to $t_{2u}$ in the embodiment described is reduced with a resistor 8 of 5 ohm from 2 $\mu$sec. to approximately 1.2 $\mu$sec. as a result of the measure according to the invention. Higher values of the resistor 8 result in a further reduction of the switching-off period $t_{2c}$ to $t_{2u}$.

Figure 3A:
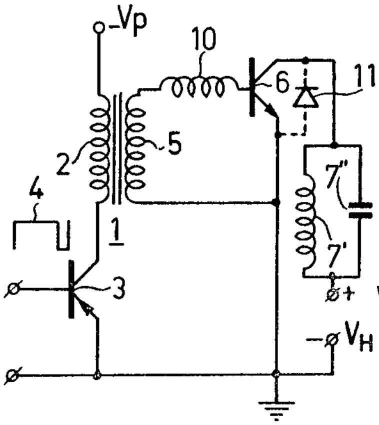
FIGS. 3 shows another embodiment of the circuit arrangement according to the invention with the associated current and voltage curves.
Figure 3B:
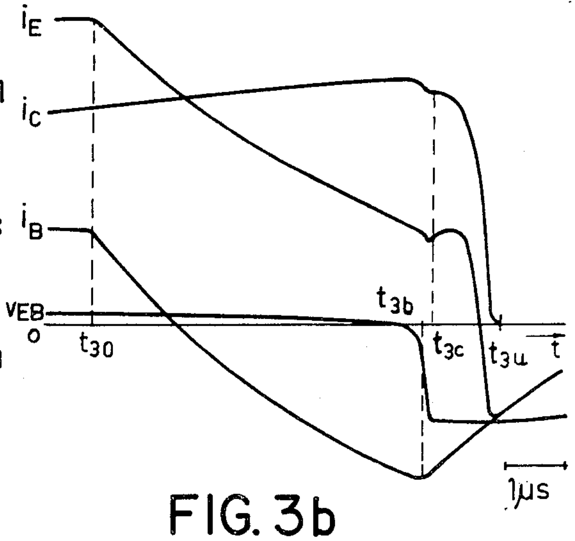

According to another measure of the invention, FIG. 3*a* shows that the secondary winding 5 of the transformer 1 is connected to the base electrode of the transistor 6 through a coil 10. It is shown in FIG. 3*b* that after the occurrence of the trailing edge of the signal 4 at the instant $t_{30}$ the variation with respect to time of the base current $i_B$ is restricted by the coil 10. At the instant $t_{3b}$ the current $i_B$ reaches the maximum value and, as may be concluded from curve $v_{EB}$, the emitter-base junction becomes cutoff. The reduction of the collector current $i_C$ sets in at the instant $t_{3c}$ and the current $i_C$ reaches the zero value at the instant $t_{3u}$. In the embodiment described using a coil 10 of 10 $\mu$H, the switching-off period $t_{3c}$ to $t_{3u}$ is found to be approximately 1 $\mu$sec. This results in an average differential coefficient of the collector current $i_c$ with respect to time of the value 2A/$\mu$s.

Figures 4A, 4B:
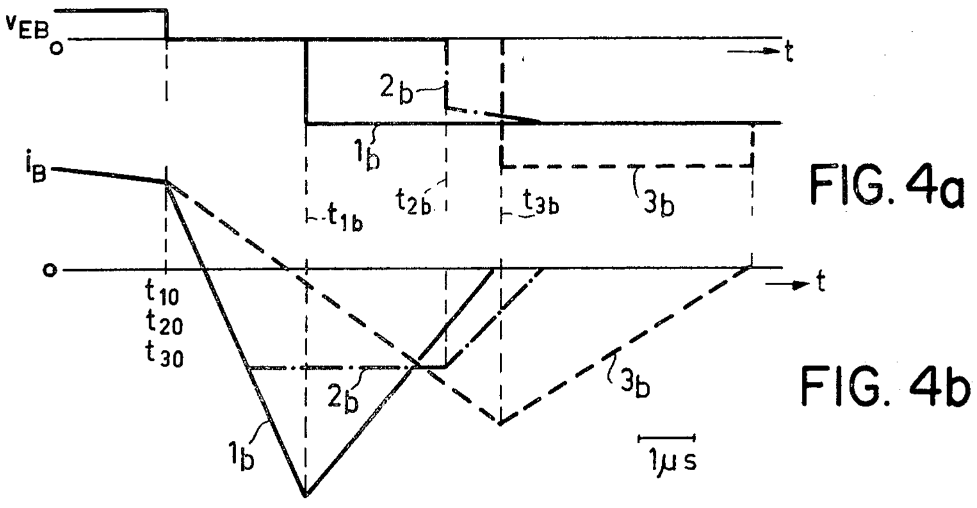
FIGS. 4 is an explanation of the principle of the invention.

Before describing FIG. 3*a* in detail, FIG. 4 is first described in which collectively, in an idealized and diagrammatic manner, a few graphs 1*b*, 2*b*, 3*b* are shown which correspond to the curves which are shown in FIGS. 1*b*, 2*b*, 3*b*. FIG. 4*a* shows the variation of the voltage $v_{EB}$ between the base and emitter electrodes of the transistor 6 and FIG. 4*b* shows the base currents $i_B$ occurring.

The following may serve for further explanation of the principle according to the invention. The emitter-base junction in the transistor 6 becomes blocked at different instants ($t_{1b}$, $t_{2b}$, $t_{3b}$) in the graphs 1*b*, 2*b*, 3*b*. Up to these instants, the excess of charge carriers in the transistor 6 is removed through the base current $i_B$. For a transistor 6 of the low voltage type in which the excess of charge carriers occurs particularly in the base layer, no long period of time is required to remove said excess of charge carriers. This period of time may be further reduced by increasing the voltage applied to the base electrode for switching off the low voltage transistor 6. For a transistor 6 of the high voltage and/or power type, the excess of charge carriers may be removed from the base layer in the same manner in a short period of time, but, as shown in FIG. 1*b*, this has substantially no influence on the switching-off time of the collector current $i_C$. According to the recognition of the invention, however, the excess of charge carriers is not removed from the base layer as rapidly as possible but rather in a delayed manner so that it is obtained that during said extended period of time, the excess charge carriers present in the thick collector layer have the opportunity of moving to the base layer to be then removed therefrom. It is reached in this manner that by extending the period of time after which the base-emitter junction becomes blocked, the charge carriers present in excess in the transistor 6 are removed from substantially the whole transistor 6.

It will be obvious that for making the instants $t_{1u}$, $t_{2u}$, $t_{3u}$ (at which the collector current $i_C$ is fully switched off) to coincide, the instants $t_{20}$ and $t_{30}$ should be anticipated with respect to $t_{10}$. This can be achieved easily by adapting the pulsatory signal 4.

With reference to graph 3*b* in FIG. 4*a* it holds that after the instant $t_{3b}$ at which the excessive number of charge carriers is removed from the transistor 6, the voltage $V_{EB}$ under the influence of the coil 10 shows a larger negative value than corresponds to the voltage produced by the secondary winding 5. The voltage $V_{EB}$ in fact reaches the breakdown voltage of the base-emitter diode of the transistor 6 at the instant $t_{3b}$ by building up, and maintains said voltage value during the reduced flow of base current $i_B$ through the coil 10 after the instant $t_{3b}$.

FIG. 3*a* shows a more detailed circuit arrangement for generating a sawtooth current through the line deflection coils of a television receiver, not shown. For that purpose the load impedance 7 is divided into a line deflection coil 7′ consisting, if desired, of several divided coils and a parallel arranged capacitor 7″. The two components constitute in known manner an oscillatory circuit which is impulsed when the collector current $i_C$ is switched-off. A so-called efficiency-diode 11 may be connected between the emitter and collector electrodes of the transistor 6. It is also possible to obtain the advantages of the known efficiency circuit by using the base-collector diode of the transistor 6. All this has already been described in French Pat. No. 1.506.384. It has been found that for a deflection circuit arrangement having a transistor 6, the base-collector diode of which serves as an efficiency diode, the coil 10 has a very good linearizing influence on the deflection current through the coil 7′ during the efficiency action.

It will be obvious that to achieve the principle of the invention the construction of the control means (1,3) is of minor importance. The same applies to the construction of a circuit arrangement utilizing transistors 3 and/or 6 of a conductivity type opposite to that shown in the Figure. It is also irrelevant whether the emitter electrode or the base electrode of the transistor 6 in the circuit arrangement is constructed as the common electrode.

I claim:

1. A switching circuit for switching a high voltage power transistor between a saturation condition and a cutoff condition comprising, means for controlling said transistor into the saturation condition, signal control means connected to supply a pulsatory switching signal between the base electrode and the emitter electrode of said transistor by means of a transformer winding, said pulsatory signal being of a magnitude and polarity to drive the transistor from saturation into cutoff, a load impedance connected to the transistor collector electrode, and means for limiting the variation in reverse base current flow that otherwise would occur due to said pulsatory signal driving the transistor from saturation into cutoff, said limiting means comprising a parallel arrangement of a resistor and a unidirectional current conducting element connected between the transistor base electrode and one terminal of the transformer winding, the current conducting direction of said element corresponding to the pass direction of the base-emitter junction of the transistor, and means directly connecting the other transformer winding terminal to the transistor emitter electrode.

2. A circuit as claimed in claim 1 wherein said unidirectional current element comprises a diode and the magnitude of said pulsatory switching signal is below the zener breakdown voltage of the diode.

3. A switching circuit for switching a high voltage power transistor between a saturation condition and a cutoff condition comprising, means for controlling said transistor into the saturation condition, signal control means connected to supply a pulsatory switching signal between the base electrode and the emitter electrode of said transistor by means of a transformer winding, said pulsatory signal being of a magnitude and polarity to drive the transistor from saturation into cutoff, a load impedance connected to the transistor collector electrode, and means for limiting the variation in reverse base current flow that otherwise would occur due to said pulsatory signal driving the transistor from saturation into cutoff, said limiting means comprising impedance means including a coil connected between the transistor base electrode and one terminal of the transformer winding, and means directly connecting the other transformer winding terminal to the transistor emitter electrode.

4. A switching circuit for switching a high voltage power transistor between a saturation condition and a cutoff condition comprising, means for controlling said transistor into the saturation condition, signal control means connected to supply a pulsatory switching signal between the base electrode and the emitter electrode of said transistor by means of a transformer winding, said pulsatory signal being of a magnitude and polarity to drive the transistor from saturation into cutoff, a load impedance that includes the line deflection coil of a cathode-ray tube connected to the transistor collector electrode, the transistor base-collector junction diode serving as an efficiency diode for producing a sawtooth current in said deflection coil, and means for limiting the variation in reverse base current flow that otherwise would occur due to said pulsatory signal driving the transistor from saturation into cutoff, said limiting means comprising impedance means connected between the transistor base electrode and one terminal of the transformer winding, and means directly connecting the other transformer winding terminal to the transistor emitter electrode.

5. A transistor circuit comprising a high voltage power transistor, control means for supplying a pulsatory switching signal between the base and emitter of said transistor of a magnitude to drive the transistor alternately into saturation and cutoff, a load impedance connected to the transistor collector electrode, means for coupling said control means between the base and emitter of the transistor, said coupling means comprising impedance means connected between the control means and said base electrode for limiting the variation in reverse base current flow when said pulsatory signal drives the transistor from saturation into cutoff, said impedance means being operative to cause the reverse base current to flow for a longer time than it would otherwise flow in the absence of the impedance means in the circuit.

6. A circuit as claimed in claim 5 wherein said impedance means comprises an inductor.

7. A circuit as claimed in claim 6 wherein said control means includes a transformer having a primary winding connected to a source of pulsatory voltage and a secondary winding connected to the inductor and to the emitter of the transistor.

8. A transistor circuit comprising a transistor, an input circuit connected between the emitter and the base electrodes of said transistor, an output circuit connected to the collector electrode of said transistor, and means connecting a point of said input circuit to a point of reference potential, said input circuit comprising a source of a pulsatory switching signal whereby said transistor is periodically driven to a saturated state and to a cutoff state, said input circuit further comprising impedance means serially connected in the portion of said input circuit between said point of said input circuit and said base electrode for reducing the variation in reverse base current of said transistor during the transition period from the saturated to the cutoff state, thereby to increase the average differential coefficient of collector current with respect to time of said transistor during the terminal portion of the transition period of said collector current.

9. The circuit of claim 8 wherein said transistor is of the type having a collector layer of sufficient thickness such that a variation of the amplitude of blocking signals between the emitter and base electrodes have no substantial effect on said coefficient.

10. The circuit of claim 8 wherein said impedance means comprises a parallel circuit of a resistor and a diode, said diode being connected in the pass direction with respect to forward base current.

11. The circuit of claim 8 wherein said impedance means comprises a coil.

12. A circuit as claimed in claim 10 wherein the magnitude of said pulsatory switching signal is below the zener breakdown voltage of the diode.